United States Patent
Ridgway et al.

(10) Patent No.: US 7,188,866 B2
(45) Date of Patent: Mar. 13, 2007

(54) STEERING COLUMN ASSEMBLY AND METHOD OF FABRICATING THE SAME

(75) Inventors: Jason R. Ridgway, Bay City, MI (US); Jeremy A. Ponichtera, Saginaw, MI (US); Amelia M. Waeghe, Bay City, MI (US)

(73) Assignee: Delphi Technologies, Inc, Troy, MI (US)

( * ) Notice: Subject to any disclaimer, the term of this patent is extended or adjusted under 35 U.S.C. 154(b) by 399 days.

(21) Appl. No.: 10/788,150

(22) Filed: Feb. 26, 2004

(65) Prior Publication Data

US 2005/0189756 A1    Sep. 1, 2005

(51) Int. Cl.
    *B62D 1/00*    (2006.01)
(52) U.S. Cl. ..................................... 280/777
(58) Field of Classification Search ............... 280/775, 280/777, 779
    See application file for complete search history.

(56) References Cited

U.S. PATENT DOCUMENTS

| | | | | |
|---|---|---|---|---|
| 5,005,863 | A | * | 4/1991 | Drefahl ....................... 280/777 |
| 5,788,278 | A | | 8/1998 | Thomas et al. |
| 6,022,047 | A | | 2/2000 | Okubo |
| 6,254,131 | B1 | | 7/2001 | Link |
| 6,435,555 | B1 | | 8/2002 | Seamon et al. |
| 6,592,148 | B2 | | 7/2003 | Byers et al. |
| 6,685,224 | B2 | * | 2/2004 | Pardonnet ................... 280/775 |
| 2002/0121771 | A1 | | 9/2002 | Shifflett et al. |
| 2004/0046379 | A1 | * | 3/2004 | Riefe .......................... 280/777 |
| 2004/0239090 | A1 | * | 12/2004 | Riefe et al. ................. 280/777 |
| 2005/0029794 | A1 | * | 2/2005 | Riefe et al. ................. 280/777 |

FOREIGN PATENT DOCUMENTS

| | | |
|---|---|---|
| EP | 0443881 A2 | 8/1991 |
| EP | 0458456 A1 | 11/1991 |
| EP | 0463501 A1 | 1/1992 |

* cited by examiner

*Primary Examiner*—Eric Culbreth
*Assistant Examiner*—Barry Gooden, Jr.
(74) *Attorney, Agent, or Firm*—Michael D. Smith (57) ABSTRACT

A steering column assembly of the present invention includes a lower support bracket, an upper support bracket, and a jacket disposed within and extending along a longitudinal axis through the lower support bracket and the upper support bracket. The steering column assembly includes a yoke support housing and a plurality of tubes spaced from one another circumferentially about the longitudinal axis and interconnecting the yoke support housing and the upper support bracket. The invention includes a method of fabricating the assembly. An advantage of the present invention is to provide the steering column assembly that achieves a high section modulus, improved and predetermined stiffness characteristics, and improved packaging characteristics to hold various components such as ECL mechanisms, steering tube position sensors, BSTI switches, wires and the like.

28 Claims, 5 Drawing Sheets

STEERING COLUMN ASSEMBLY AND METHOD OF FABRICATING THE SAME

BACKGROUND OF THE INVENTION

1. Field of the Invention

The subject invention relates to a vehicle steering column, and more particularly to a collapsible steering column.

2. Description of the Prior Art

The art is replete with various designs of steering column assemblies, such as, for example, internally collapsing, translating, standard, i.e. non-tilt, and tilt column assemblies. The U.S. Pat. No. 5,788,278 to Thomas et al., U.S. Pat. No. 6,435,555 to Seamon et al., U.S. Pat. No. 6,450,532 to Ryne et al., U.S. Pat. No. 6,592,148 to Byers et al., and U.S. Patent Application Publication No. 2002/0121771 to Shifflett et al. disclose different designs of the steering column assemblies. The stiffness characteristics of the steering column assembly designs depend on common mathematical models and engineering software (FEA), which do not provide accurate determination of the stiffness. The inaccuracy in determination of the stiffness of the steering column assembly results in design changes after experimental testing.

There is a constant need in area of steering column assembly designs for an assembly wherein the stiffness of the jacket is determined before installation of the assembly on the vehicle and experimental testing and for the assembly having improved packaging characteristics to hold various components of the assembly such as wires, ECL mechanisms, steering tube position sensors, BSTI switches, and the like.

BRIEF SUMMARY OF INVENTION

A steering column assembly of the present invention includes a lower support bracket and an upper support bracket. The steering column assembly includes a yoke support housing and a plurality of tubes spaced from one another circumferentially about a longitudinal axis and rigidly interconnecting the yoke support housing and the upper support bracket. A jacket is fixed to one of the lower and upper support brackets and is slidable relative to the other of the lower and upper support brackets about the longitudinal axis between an uncollapsed position and a collapsed position of said steering column assembly.

The present invention includes a method of fabricating the steering column assembly having the lower support bracket and the upper support bracket presenting a longitudinal axis disposed within and extending through the lower support bracket and the upper support bracket. The method includes the steps of positioning the yoke support housing adjacent to the upper support bracket, selecting a group of tubes from a plurality of tube configurations, and mechanically interconnecting the yoke support housing with the upper support bracket by disposing the group of tubes therebetween and by spacing the tubes from one another circumferentially about the longitudinal axis. The method includes the step of disposing the jacket fixed to one of the lower and upper support bracket to facilitate slidably movement of the jacket relative to the other of the lower and the upper support brackets about the longitudinal axis between an uncollapsed position and a collapsed position of the steering column assembly.

An advantage of the present invention is to provide the steering column assembly design that achieves a high section modulus, and improved and predetermined stiffness characteristics.

Another advantage of the present design is to provide the steering column assembly having improved packaging characteristics to hold various components of a tilt assembly.

Still another advantage of the present invention is to provide the steering column assembly having the yoke support housing interconnected with the upper support bracket and the jacket fixed between the upper and lower support brackets. This design facilitates easier and more reliable movement of the jacket relative to one of the lower and the upper support brackets about the longitudinal axis between the uncollapsed and collapsed position of the steering column assembly thereby eliminating need to translate tubes of prior art design through the corresponding holes defined in the prior art upper and lower brackets for spanning the entire prior art steering column.

Still another advantage of the present invention is to provide tubes interconnecting the upper support bracket and the yoke support housing to store wires and other devices within the tubes, thereby providing the tubes with wire routing and wire protecting features at no additional cost.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Referring to the Figures wherein like numerals indicate like or corresponding parts throughout the several views, a steering column assembly of the present invention is generally shown at 100.

The steering column assembly 100 of the present invention includes a lower support bracket 102, an upper support bracket 104, and a jacket 106 disposed within and extending along a longitudinal axis O through the lower support bracket 102 and the upper support bracket 104. The steering column assembly 100 includes a yoke support housing 108 and a plurality of tubes 110 spaced from one another circumferentially about the longitudinal axis O of the jacket 106 and interconnecting the yoke support housing 108 and the upper support bracket 104.

Figure 1:
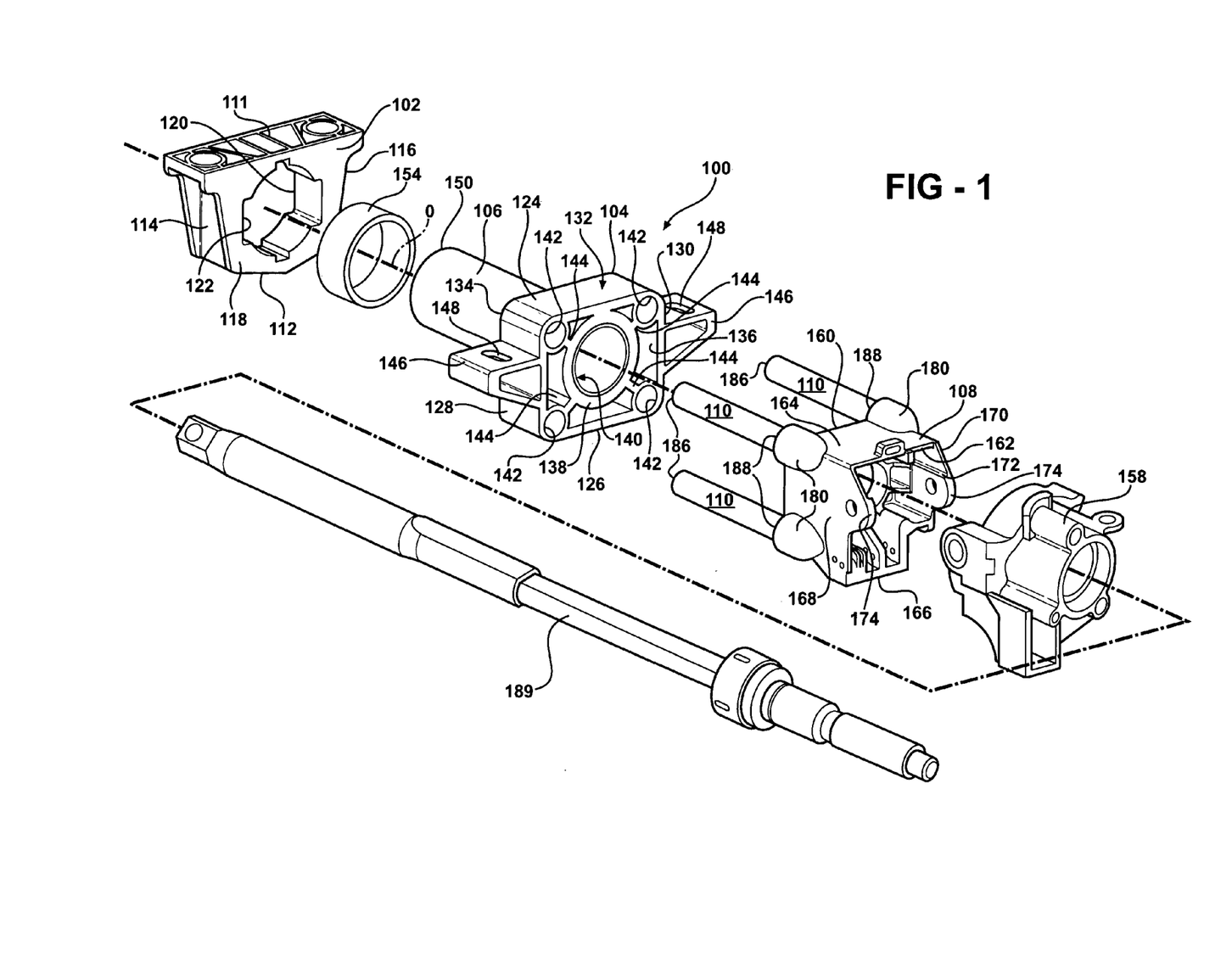
FIG. 1 is an exploded perspective view of a steering column assembly having upper and lower support brackets interconnected by a jacket disposed therein, and a yoke support housing interconnected with the upper support bracket by a plurality of tubes.
Figure 2:
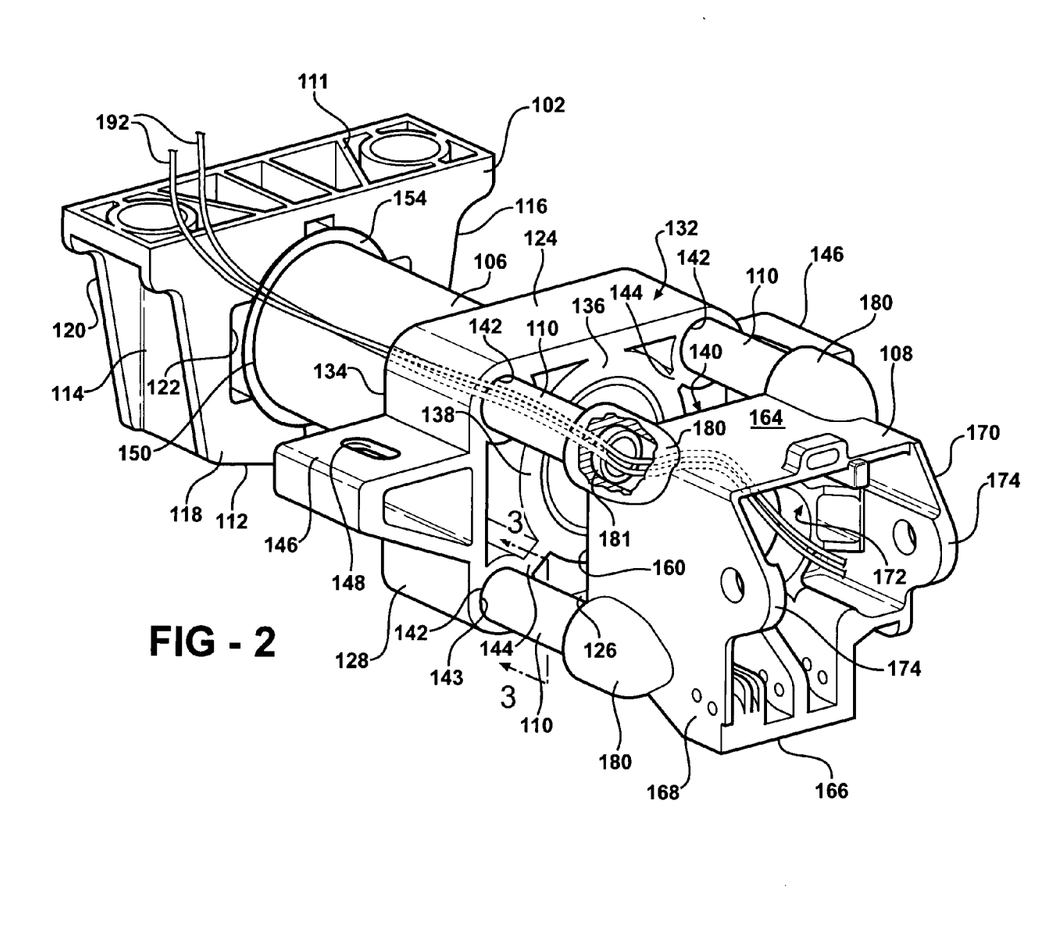
FIG. 2 is another perspective view of the steering column assembly, partially cut away and in cross section

Referring to FIGS. 1 and 2, the lower support bracket 102 of the present invention includes a generally rectangular configuration and is designed for connecting the steering column assembly 100 to a body of a vehicle (not shown). The lower support bracket 102 has top 111, bottom 112, side walls 114, 116, and front 118 and rear 120 ends. The lower support bracket 102 includes an opening 122 defined therewithin. The lower support bracket 102 is preferably injection molded from a plastic or polymer material, however it should be recognized that it can also be molded or machined from a metallic material such as steel or aluminum.

The upper support bracket 104 has a generally rectangular configuration and is designed for connecting the steering column assembly 100 to the body of the vehicle adjacent from the point of connection of the lower support bracket 102. The upper support bracket 104 includes top side 124, bottom side 126, side walls 128, 130 interconnected therebetween at the respective tops to define a peripheral edge, generally indicated at 132. The upper support bracket 104 further includes rear 134 and front 136 ends and a boss section 138 integral with the upper support bracket 104 and extending from the rear end 134 to the front end 136. The boss section 138 includes an inlet of a generally circular configuration, generally indicated at 140, defined therewithin to receive the jacket 106 stationary engaged within the inlet 140.

Referring back to FIG. 1, the upper support bracket 104 includes interior pockets 142 spaced one from the other and defined around the peripheral edge 132 at the front end 136 of the upper support bracket 104. The interior pockets 142 are interconnected with the boss section 138 by a wall 144, respectively, to increase stiffness of the upper support bracket 104. The upper support bracket 104 includes a flange 146 integral with and extending outwardly from each of the side walls 128, 130 in a cantelivered fashion. Each flange 146 includes a slot 148 defined therewithin to receive a shear device (not shown) activated during a collision of a vehicle. The upper support bracket 104 is preferably injection molded from a plastic or polymer material, however it should be recognized that it can also be molded or machined from a metallic material such as steel or aluminum.

The jacket 106 of the steering column assembly 100 includes a generally tubular configuration and has the terminal ends 150, 152. The jacket 106 includes a first sleeve 154, as best shown in FIG. 1, disposed annularly about one of the terminal ends 150 of the jacket 106 and between the lower support bracket 102. The first sleeve 154 prevents frictional engagement between the jacket 106 sliding through the lower support bracket 102 in case of a collision.

Figure 7:
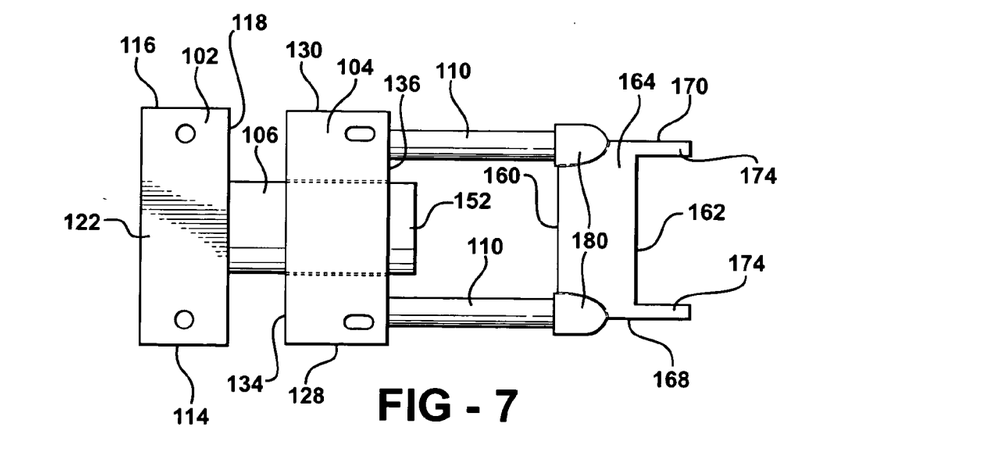
FIG. 7 is a plan view of the steering column assembly, wherein the upper support bracket, connected with the yoke support housing, is moved axially along the jacket to the lower support bracket during a collision.
Figure 8:
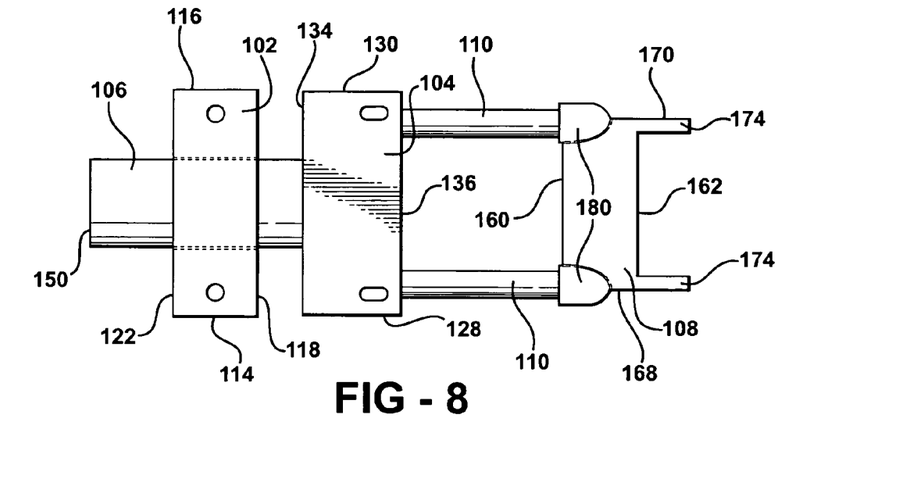
FIG. 8 is a plan view of the steering column assembly, wherein the jacket connected to the upper support bracket, is moved axially through the lower support bracket during the collision.

The jacket 106 includes a second sleeve (not shown), similar disposed annularly about another telescoping end 152 of the jacket 106 and between the upper support bracket 104. The second sleeve prevents frictional engagement between the jacket 106 sliding through the upper support bracket 104 in case of the collision. The lower support bracket 102 and the upper support bracket 104 are stationary mounted to the body of the vehicle. During the collision, the upper 104 and lower 102 support brackets collapse internally with respect to one another. FIG. 7, for example, shows the steering column assembly 100 in an internally collapsing mode, wherein the jacket 106 is connected to the lower support bracket 102 and extends through and beyond the upper support bracket 104 still maintaining stiffness between the upper support bracket 104 and the yoke support housing 108. Alternatively, as shown in FIG. 8, the steering column assembly 100 is shown in a translating mode, wherein the jacket 106 is connected to the upper support bracket 104 and extends through and beyond the lower support bracket 102 still maintaining stiffness between the upper support bracket 104 and the yoke support housing 108. The jacket 106 and the sleeves 156 are preferably injection molded from a plastic or polymer material, however it should be recognized that it can also be molded or machined from a metallic material such as steel or aluminum.

As best shown in FIG. 1, the yoke support housing 108 is designed to mechanically engage a tilt assembly 158 therewithin. The yoke support housing 108 includes a generally rectangular configuration and has rear 160 and front 162 ends, top 164, bottom 166, and sides 168, 170 interconnected one with the other. The yoke support housing 108 includes a hole of a circular configuration, generally indicated at 172, defined therewithin and spaced longitudinally and axially with respect to the jacket 106. The yoke support housing 108 includes a projection 174 integral with and extending outwardly from each of the sides 168, 170 at the front end 162 of the yoke support housing 108 to engage the tilt assembly 158. The yoke support housing 108 includes exterior pockets 180 integral with the yoke support housing 108 at the top 164, bottom 166 and sides 168, 170. The exterior pockets 180 are spaced longitudinally and adjacent the interior pockets 142 of the upper support bracket 104.

Figure 3:
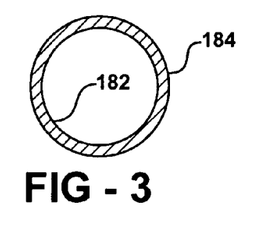
FIG. 3 is a cross sectional view of one of the tubes.
Figure 4:
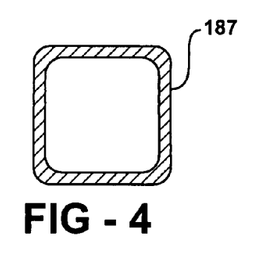
FIG. 4 is a cross sectional view of an alternative embodiment of the tube.
Figure 5:
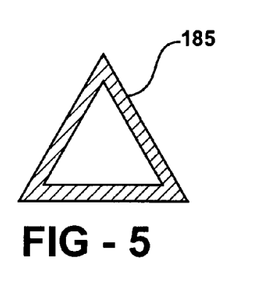
FIG. 5 is a cross sectional view of still another alternative embodiment of the tube.
Figure 6:
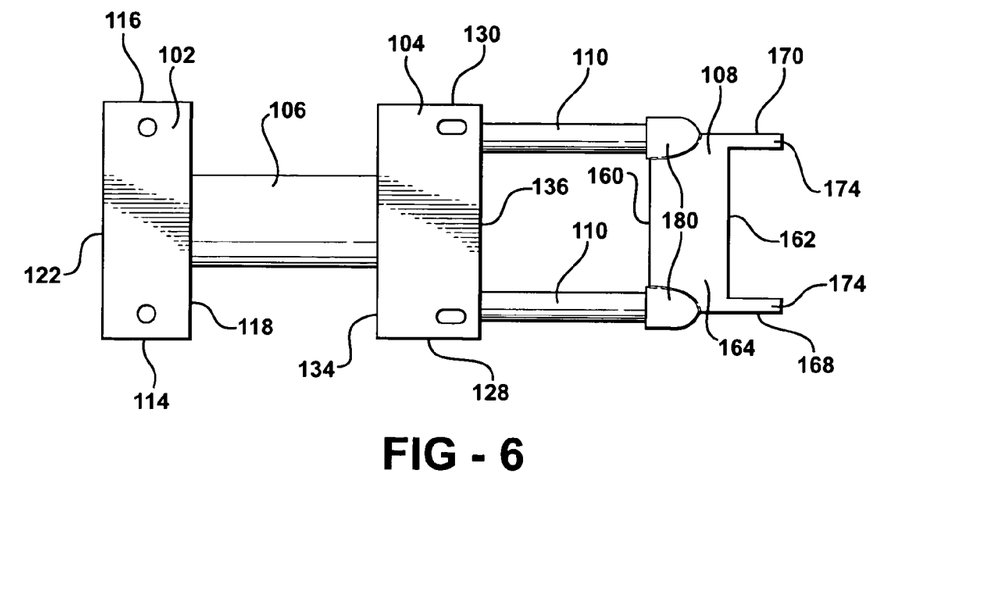
FIG. 6 is a plan view of the steering column assembly.

Referring to FIGS. 1 through 3, the invention includes four tubes 110 having a body defining inner 182 and outer 184 diameters, as view in cross section, and terminal ends 186, 188, respectively. The tubes 110 are spaced from one another circumferentially about the longitudinal axis O of the jacket 106 and interconnecting the yoke support housing 108 and the upper support bracket 104. The tubes 110 are mechanically connected with the internal pockets 142 of the upper support bracket 104 and exterior pockets 180 of the yoke support housing 108. The tubes 110 include an equal and predetermined thickness between the outer 184 and inner 182 diameters, wherein the outer diameter 184 is complimentary to predetermined inner diameter 143 of the interior pockets 142 and inner diameter 181 of the exterior pockets 180. In an alternative embodiment of the present invention, as shown in FIGS. 4 and 5, the tubes 110 may include triangular and rectangular configurations, as viewed in cross section. The interior pockets 142 of the upper support bracket 104 and the exterior pockets 180 of the yoke support housing 108 of the alternative embodiment include triangular and rectangular configurations, (not shown) to mate with the respective tubes 110 defining triangular 185, rectangular 187 configurations, respectively, as shown in FIGS. 4 and 5. The outer diameter 184 of the tube 110 is constant wherein the inner diameter 182 has a variable value with respect to different designs of the steering column assembly 100 to increase stiffness of the assembly 100 thereby increasing moment of Inertia. The steering column assembly 100 includes a shaft 189 extending through the yoke support housing 108, the jacket 106, the upper 104 and lower 102 support brackets of the steering column assembly 100.

As it appears from the results of a calculation based on a formula provided further below, the increased distance between the outer 184 and inner 182 diameters of the tubes 110, (i.e., wall thickness) provides for better stiffness of the assembly 100. An impact of the tube thickness to the moment of Inertia is shown in the formula:

$$Ix = 4 \cdot [(\frac{\pi}{64} \cdot Do^4 - \frac{\pi}{64} \cdot Di^4) + [\frac{\pi}{4} \cdot (Do^2 - Di^2)] \cdot dx^2]$$

$$Iy = 4 \cdot [(\frac{\pi}{64} \cdot Do^4 - \frac{\pi}{64} \cdot Di^4) + [\frac{\pi}{4} \cdot (Do^2 - Di^2)] \cdot dy^2]$$

where, Ix is a moment of Inertia distributed along axis x, extending horizontally from the longitudinal axis, Iy is a moment of Inertia distributed along axis y, extending vertically from the longitudinal axis O, Do is the outer diameter 184 of the tube 110, Di is the inner diameter 182 of the tube 110, dx is a distance from the longitudinal axis O in the axis x direction, dy is a distance from the longitudinal axis O in the axis y direction, and π is a ration of a circumference of the tube 110 as view in cross section, divided into a diameter of the tube 110, wherein π has a constant value of 3.14.

For example, in a first test, wherein the value of the outer diameter 184 is 0.0127 and the value of the inner diameter 182 is 0.0117 with a wall thickness of 0.001 defined therebetween, as view in cross section, and the distance from the longitudinal axis O in the axis x and y directions is 0.034—the moment of Inertia distributed along said axis x and y is 9.004E-8. In a second test, wherein the value of the outer diameter 184 remains the same and the value of the inner diameter 182 is diminished from 0.0117 to 0.0037 to receive a wall thickness of 0.009 defined therebetween, as view in cross section, and, as shown in the first test, the distance from the longitudinal axis O in the axis x and y directions remains 0.034—the moment of Inertia distributed along the axis x and y is 5.411E-7. The results of these tests show that as the wall thickness between the inner 182 and outer diameter 184 of the tube 110 is increased, the moment of Inertia is increased that results in the increased stiffness of the steering column assembly 100.

In addition, an impact of the tube 110 separation is proved by using the aforementioned formula, wherein in the first and second tests the value of the outer diameter 184 of the tube 110 is 0.0127 and the value of the inner diameter 182 is 0.0117 with a thickness of 0.001 defined therebetween, as view in cross section. The distance from the longitudinal axis O in the axis x and y directions varies from 0.034 to 0.054, respectively. The results of these tests show that as the distance from the longitudinal axis O is increased from 0.034 to 0.054, the moment of Inertia is increased from 9.004E-8 to 2.25E-7, which results in the increased stiffness of the steering column assembly 100.

Figure 9:
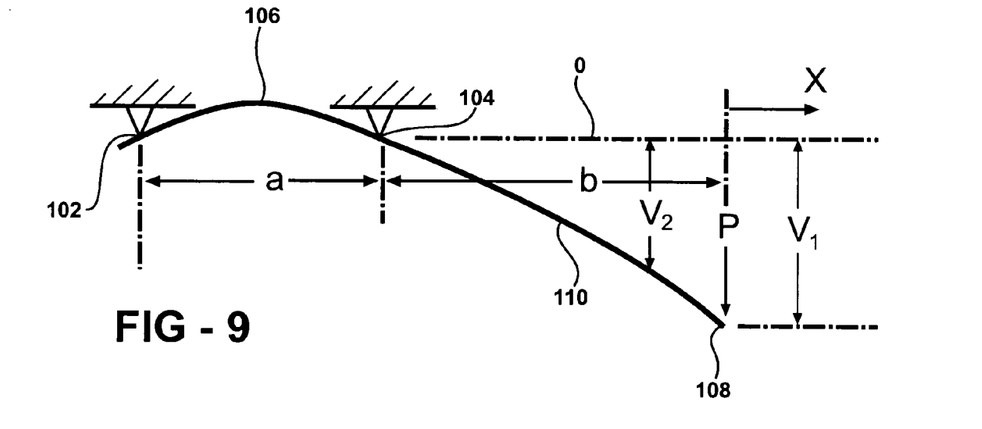
FIG. 9 is a graph showing impact of the tube length on a deflection of the tube with respect to a longitudinal axis of the steering column assembly.

In addition to the tube separation and tube wall thickness, the length of the tube 110 with respect to each individual design of the steering column assembly 100 provides for increased stiffness of the steering column assembly 100, as shown in FIG. 9. For example, an impact of the tube 110 length to a deflection V is shown in the formula:

$$\frac{P(b+x)^2(a+b+x)}{3EI} \Big/ \frac{Pb^2L}{3EI} \Big\backslash \frac{P(b-x)^2(a+b-x)}{3EI}$$

where, I is a moment of Inertia,

P is a mass of a load provided by the yoke support housing 108,

L is the length of the tube 110,

E is a modulus of elasticity of the tube 110, a is a distance between the lower support bracket 102 and the upper support bracket 104 connected to the body of the vehicle, b is a distance between the upper support bracket 104 and the yoke support housing 108, and x is a value of a increased distance of b.

This formula shows that the increased distance of b increases the deflection from V1 to V2 between the longitudinal axis O and the yoke support housing 108, thereby decreasing the stiffness and the moment of Inertia of the steering column assembly 100.

The design of the present invention achieves a high section modulus, which has a proportional influence to the natural frequency of the steering column assembly 100 through the stiffness. The advantages of the present design include improved packaging characteristics, unlike typical column assembly designs, shown in aforementioned U.S. Pat. No. 6,592,148 to Byers et al. and U.S. Patent Application Publication No. 2002/0121771 to Shifflett et al. A space defined between the upper support bracket 104 and the yoke support housing 108 interconnected and spaced apart by the tubes 110, define a gap, generally indicated at 190, to hold various components of the tilt assembly 158 including ECL mechanisms, steering tube position sensors, BSTI switches, and the like (not shown). In addition, the tubular geometry of the tubes 110 provides for ability to store wires 192 and other devices within the tubes 110, thereby providing the tubes 110 with wire routing and wire protecting features at no additional cost.

Figure 10:
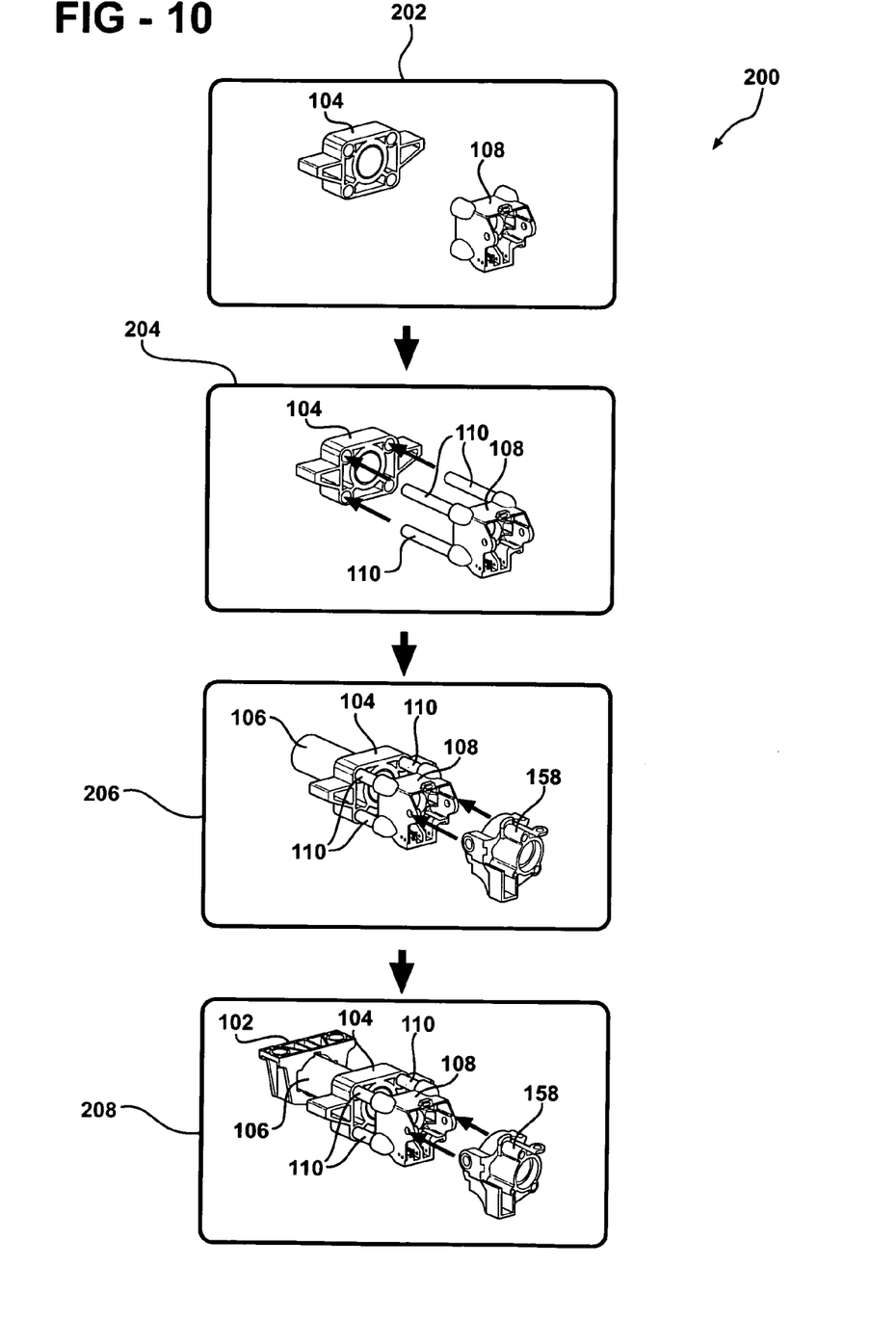
FIG. 10 shows steps of a method of fabricating the steering column assembly.

The invention includes a method, generally indicated at 200, of fabricating the steering column assembly 100, as shown in FIG. 10. The method 200 begins with positioning 202 the yoke support housing 108 adjacent the upper support bracket 104. The next step (not shown) includes selecting the group of tubes 110 having the inner 182 and outer 184 diameters from a plurality of tube configurations. The next step of the method 200 includes connecting 204 the yoke support housing 108 to the upper support bracket 104, wherein the yoke support housing 108 is longitudinally spaced from the upper support bracket 104 by the group of four tubes 110 equally spaced from one another. The step of connecting 204 the yoke support housing 108 to the upper support bracket 104 further includes disposing the tubes 110 having an equal and predetermined thickness between the outer 184 and inner 182 diameters, as viewed in cross section. The tubes 110 are mechanically interconnected within the interior pockets 142 of the upper support bracket 104 at one of the terminal ends 186 and within the exterior pockets 180 of the yoke support housing 108 at another terminal end 188, respectively. As appreciated by those skilled in the art, various methods of interconnecting the tubes 110 within the upper support bracket 104 and the yoke support housing 108 are provided. Preferably, the tubes 110 are being press stamped within the upper support bracket 104 and the yoke support housing 108. Alternatively, the tubes 110 may include male connectors (not shown) to complement with female connectors (not shown) defined within the interior pockets 142 of the upper support bracket 104 and exterior pockets 180 of the yoke support housing 108. The step of connecting 204 the yoke support housing 108 to the upper support bracket 104 of the method 200 further includes the step of disposing 206 a jacket 106 fixed to one of the lower 102 and upper 104 support bracket to facilitate slidably movement of the jacket 106 relative to the other of the lower 102 and the upper 104 support brackets about the longitudinal axis O between an uncollapsed position and a collapsed position of the steering column assembly 100.

With respect to different embodiments of the steering column assembly 100, the jacket 106 requires the sleeve 154 to prevent frictional engagement between the jacket 106 and the upper and lower 102 support brackets. In another alternative embodiment, the method 200 includes the step of disposing (not shown) the sleeve 154 annularly about another terminal 152 end of the jacket 106 and between the upper support bracket 104. In one alternative embodiment, the method 200 includes the step of disposing the sleeve 154 annularly about one of the terminal ends 150 of the jacket 106 and between the lower support bracket 102 (not shown).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly comprising:
    a lower support bracket;
    an upper support bracket;
    a yoke support housing;
    a plurality of tubes spaced from one another circumferentially about a longitudinal axis and rigidly interconnecting said yoke support housing and said upper support bracket; and
    a rigid jacket extending along said longitudinal axis and disposed within said circumferentially spaced tubes with said jacket being fixed to one of said lower and upper support brackets and slidable relative to the other of said lower and upper support brackets about said longitudinal axis between an uncollapsed position and a collapsed position of said steering column assembly.

2. A steering column assembly as set forth in claim 1 wherein said jacket includes a generally tubular configuration having first and second terminal ends.

3. A steering column assembly as set forth in claim 1 wherein said jacket is injection molded.

4. A steering column assembly as set forth in claim 1 wherein said jacket is extruded.

5. A steering column assembly as set forth in claim 1 wherein said jacket is metallic.

6. A steering column assembly as set forth in claim 2 wherein said jacket further includes a first bushing extending between said first terminal end and said lower support bracket to facilitate sliding of said jacket in said collapsible position and to prevent friction between said jacket and said lower support bracket.

7. A steering column assembly as set forth in claim 1 wherein said jacket further includes a second bushing extending between said second terminal end and said upper support bracket to facilitate sliding of said jacket in said collapsible position and to prevent friction between said jacket and said upper support bracket.

8. A steering column assembly as set forth in claim 7 wherein said first bushing and said second bushing are injection molded.

9. A steering column assembly as set forth in claim 7 wherein said first bushing and said second bushing are extruded.

10. A steering column assembly as set forth in claim 7 wherein said first bushing and said second bushing are metallic.

11. A steering column assembly as set forth in claim 1 including four of said tubes.

12. A steering column assembly as set forth in claim 11 wherein said four tubes are equally spaced from one another.

13. A steering column assembly as set forth in claim 12 wherein each said tube has terminal ends and inner and outer diameters.

14. A steering column assembly as set forth in claim 13 wherein all of said tubes have an equal and predetermined thickness between said outer and inner diameters.

15. A steering column assembly as set forth in claim 1 wherein said lower support bracket includes a generally rectangular configuration having top, bottom, side walls and front and rear ends and an opening defined within said lower support bracket.

16. A steering column assembly as set forth in claim 1 wherein said upper support bracket includes a generally rectangular configuration having top side, bottom side, side walls interconnected therebetween to define a peripheral edge and rear and front ends and a circular boss section having an inlet defined therewithin.

17. A steering column assembly as set forth in claim 16 wherein said upper support bracket further includes interior pockets spaced one from the other around said peripheral edge at said front end of said upper support bracket.

18. A steering column assembly as set forth in claim 17 wherein said interior pockets are interconnected with said boss section by a wall, respectively.

19. A steering column assembly as set forth in claim 18 wherein said interior pocket has predetermined inner diameter.

20. A steering column assembly as set forth in claim 19 wherein said side walls of said upper support bracket include a flange integral with and extending outwardly from each of said side walls in a cantilevered fashion.

21. A steering column assembly as set forth in claim 1 wherein said yoke support housing includes a generally rectangular configuration having rear and front ends, top, bottom, and sides interconnected one with the other.

22. A steering column assembly as set forth in claim 21 wherein said yoke support housing further includes exterior pockets integral with said yoke support housing at said top, bottom and sides.

23. A steering column assembly as set forth in claim 22 wherein said exterior pockets are longitudinally spaced and adjacent said interior pocket of said upper support bracket.

24. A steering column assembly comprising:
    a lower support bracket for connecting to a body of a vehicle;

said lower support bracket having a generally rectangular configuration and top, bottom, side walls, and front and rear ends and an opening defined within said lower support bracket;

an upper support bracket for connecting to the body of the vehicle;

said upper support bracket having a generally rectangular configuration and having top side, bottom side, side walls interconnected therebetween to define a peripheral edge and rear and front ends and a circular boss section having an inlet defined therewithin;

said upper support bracket including interior pockets spaced one from the other around said peripheral edge at said front end of said upper support bracket, said interior pockets are interconnected with said boss section by a wall, respectively;

said interior pockets having predetermined inner diameter;

said side walls of said upper support bracket including a flange integral with and extending outwardly from each of said side walls in a cantilevered fashion;

a jacket of a generally tubular configuration having terminal ends and fixed to one of said upper and lower support brackets and slidable relative to the other of said lower support bracket and said upper support bracket about a longitudinal axis between an uncollapsed position and a collapsed position;

a first sleeve disposed annularly about said first terminal end of said jacket and between said lower support bracket to prevent frictional engagement between said jacket and said lower support bracket;

a second sleeve disposed annularly about said second terminal end of said jacket and between said upper support bracket to prevent frictional engagement between said jacket and said upper support bracket;

a yoke support housing of a generally rectangular configuration having rear and front ends, top, bottom, and sides interconnected one with the other, and an aperture defined within said yoke support housing;

said yoke support housing including exterior pockets integral with said yoke support housing at said top, bottom and sides, said exterior pocket are longitudinally spaced and adjacent said interior pocket of said upper support bracket;

four tubes having a body defining inner and outer diameters, as view in cross section, and terminal ends, respectively;

said four tubes are equally spaced from one another;

said tubes having an equal and predetermined thickness between outer and inner diameters;

said outer diameter are complimentary to predetermined inner diameter of said interior pockets of said upper support bracket and predetermined inner diameter of said exterior pockets of said yoke support housing; and said tubes are engaged within said interior pocket of said upper support bracket at one of said terminal ends and within said exterior pocket of said yoke support housing at another terminal end.

25. A method of fabricating a steering column assembly having a lower support bracket and an upper support bracket presenting a longitudinal axis disposed between the lower support bracket and the upper support bracket, comprising the steps of:

positioning a yoke support housing adjacent to the upper support bracket; selecting a group of tubes having inner and outer diameters from a plurality of tube configurations; and mechanically interconnecting the yoke support housing with the upper support bracket by rigidly connecting the group of tubes therebetween and by spacing the tubes from one another circumferentially about the longitudinal axis;

connecting a rigid jacket fixed to one of the lower and upper support bracket and orientating the jacket along the longitudinal axis with the circumferentially spaced tubes to facilitate sliding movement of the jacket relative to the other of the lower and the upper support brackets along the longitudinal axis between an uncollapsed position and a collapsed position of the steering column assembly.

26. A method of fabricating a steering column assembly as set forth in claim 25 wherein the step of connecting the yoke support housing to the upper support bracket is further defined by disposing the group of four tubes having terminal ends.

27. A method of fabricating a steering column assembly as set forth in claim 26 wherein the step of connecting the yoke support housing to the upper support bracket is further defined by disposing the group of four tubes equally spaced from one another.

28. A method of fabricating a steering column assembly as set forth in claim 27 wherein the step of connecting the yoke support housing to the upper support bracket is further defined by disposing the group of four tubes having an equal and predetermined thickness between outer and inner diameters.

* * * * *